July 27, 1965  F. PEDLEY  3,197,607
APPARATUS FOR WELDING HOLLOW COMPONENTS
Filed Oct. 25, 1962  3 Sheets-Sheet 1
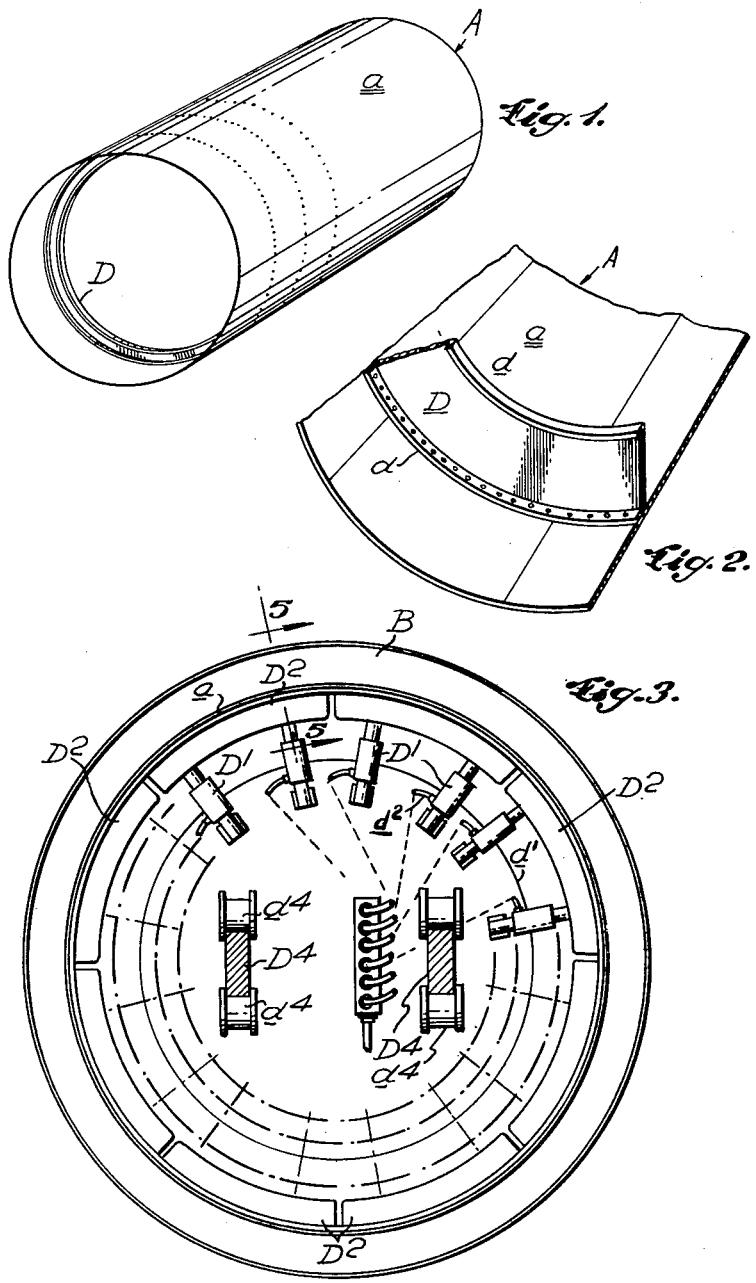
INVENTOR
Fred Pedley
BY
ATTORNEYS

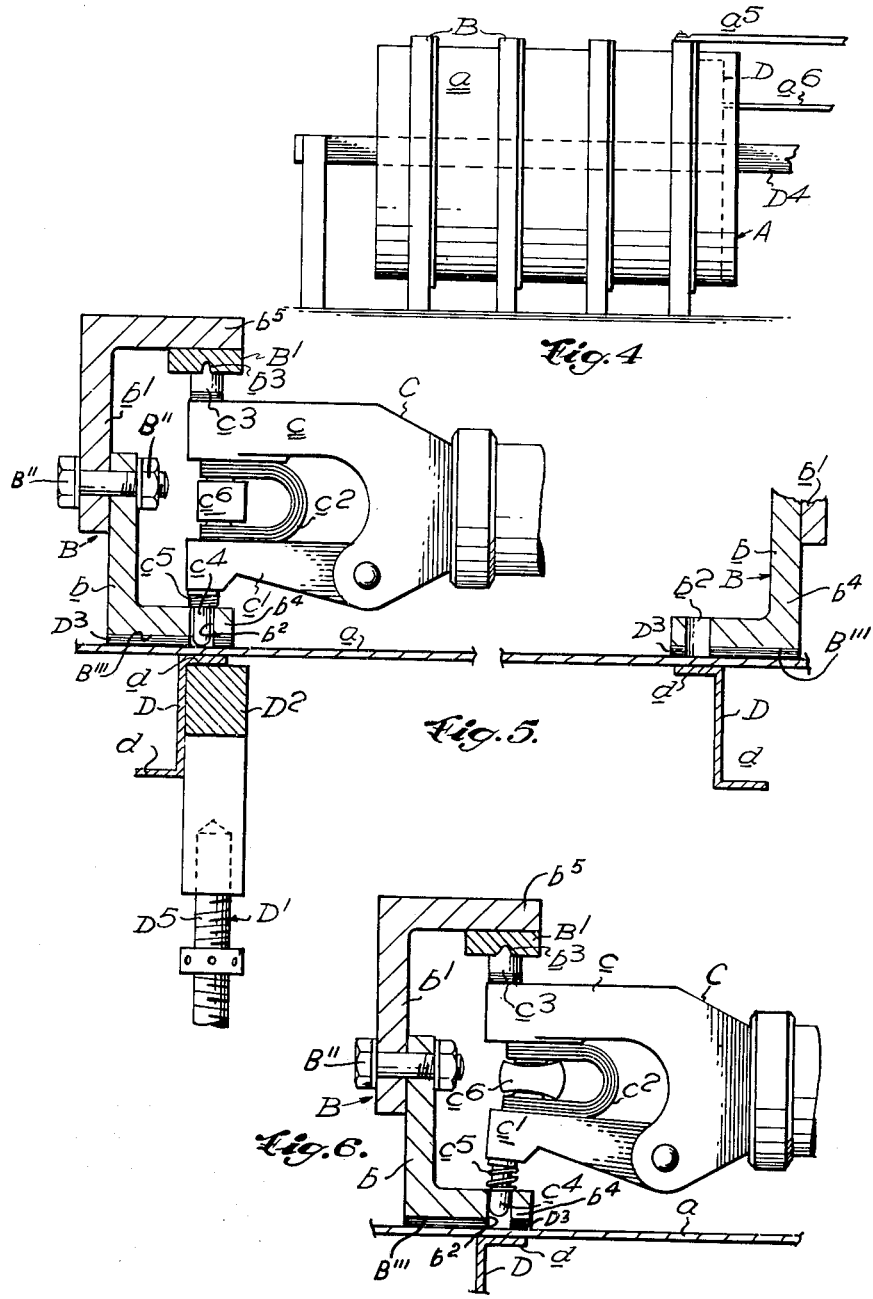

July 27, 1965 F. PEDLEY 3,197,607
APPARATUS FOR WELDING HOLLOW COMPONENTS
Filed Oct. 25, 1962 3 Sheets-Sheet 3
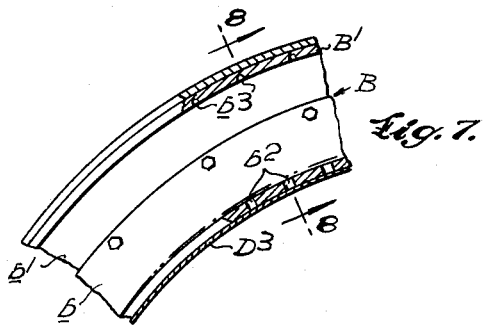
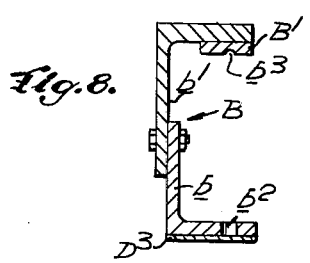
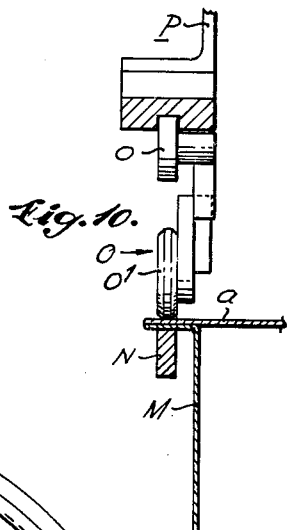
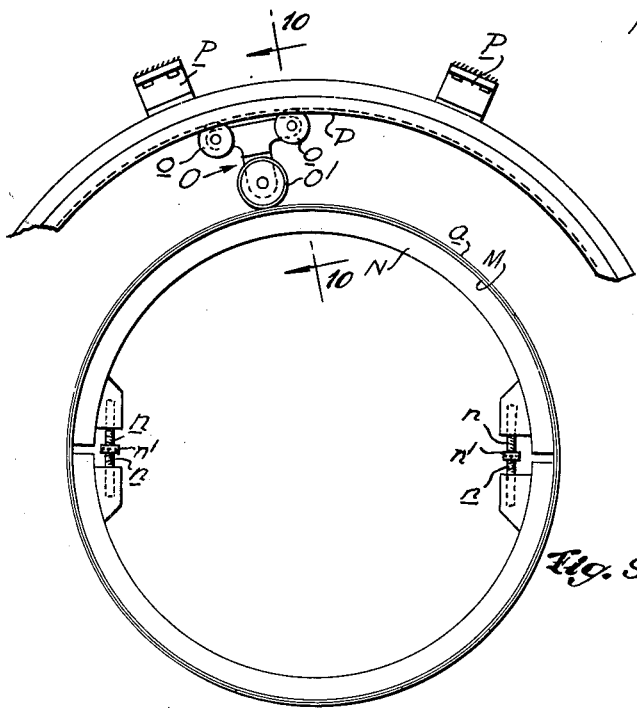
INVENTOR
Fred Pedley
BY
Morris & Bateman
ATTORNEYS

United States Patent Office 3,197,607
Patented July 27, 1965

3,197,607
APPARATUS FOR WELDING HOLLOW
COMPONENTS
Fred Pedley, The Grange, Birch, Middleton, England
Filed Oct. 25, 1962, Ser. No. 233,108
3 Claims. (Cl. 219—78)

This invention relates to an improved apparatus for welding hollow components.

Baffles and/or formers are normally resistance welded in suitable positions into air or fluid tanks by spot welding machines, when the tank dimensions are small enough to allow the tank to be rotated and otherwise manipulated within the electrode arm reach, and over and under the electrode arms of the machine.

When the tank is too great in size and weight to use a static welding machine, portable long reach electrode arms have been used with the tank held stationary, but have been found to be unsatisfactory due to the difficulty of ensuring constant electrode tip alignment, resulting in poor quality spot welds and a great variation between such spot welds.

Additionally, spot weld and seam weld failures are quite frequently caused by badly fitted joints between baffles and/or formers, and the outer skin of the tank or vessel, which detracts from the work from either static or portable machines.

The object of the present invention is to enable baffles and/or formers and the like to be consistently welded to large tanks or the like to which they cannot successfully be welded by existing machines.

The invention consists in a method for welding a hollow component, comprising enclosing the component in a jig or former shaped to the outer contour of the component internally clamping a second component to the first component and applying a welding gun to the jig or former at a predetermined position or positions to weld the two components together.

The invention further comprises apparatus for carrying out the aforesaid method.

The invention will be described with reference to the accompanying drawings showing the invention applied in the production of a cylindrical tank.

FIG. 1 is a perspective view of a tank with the ends removed;

FIG. 2 is a perspective view of part of a tank from the inside showing a reinforcing rib;

FIG. 3 is a partial longitudinal section through the tank and jig during application of a rib thereto;

FIG. 4 is a side elevation showing the jig in position;

FIG. 5 is a section enlarged on line 5—5, FIG. 3;

FIG. 6 is a further view of part of FIG. 5 showing the gun in process of application to the jig;

FIG. 7 is a detail view partly in section of part of FIG. 3 enlarged;

FIG. 8 is a section on line 8—8, FIG. 7;

FIG. 9 is an end elevation partly broken away showing the seam welding of an end of the tank, and FIG. 10 is a section on line 10—10, FIG. 9.

A fluid tight tank A of any shape is constructed with a skin $a$ of thin sheet metal of say 24 gauge, the sheets being seam welded around the periphery and longitudinally to unite the ends of the sheets. The tank may, for ery. As the tank is of thin sheet metal it is not sufficiently rigid to support itself, and in order to reinforce example, be 8 ft. long and, say, 22 ft. around the periphthe skin a rigid jig or former frame B of the desired shape of the tank is constructed into which the seam welded skin $a$ is inserted. As shown in FIGURE 5 each former frame B is annular and substantially of U-shape in rim cross-section. The rigid jig or former frame B is positioned at the junction or station of each sheet of the skin $a$, the several former frames B being rigidly aligned and connected together between the stations to ensure accurate positioning and freedom from twist or other distortion of the completed tank A. Each former frame B is formed with a continuous peripheral surface $B'''$ on the inner extremity to conform to the outer contour of the tank.

As shown in the drawings (FIGS. 1 to 8) the former frame B is constructed of an annular L shaped pressure foot $b$ and an annular reaction bar $b^1$ bolted together as by the bolt assemblies $B''$ passing through their overlapping radial legs. The pressure foot $b$ is formed with dowel holes $b^2$. An annular control bar $B'$ is carried on the underside of reaction bar $b'$ and is formed with sockets $b^3$ in radial alignment with dowel holes $b^2$ to locate a spot welding gun C. The U-shaped section of former B thus has inner and outer parallel coextensive peripheral flanges $b^4$ and $b^5$.

The spot welding gun may be formed with an expanding member operated by an air cylinder or hydraulic or other means and is mounted between the two flanges of the former B.

The gun C is formed with two jaws $c$, $c^1$ pivoted together to expand outwardly and connected by a flexible copper laminated connecting member $c^2$. One jaw $c$ of the gun is provided with a projection $c^3$ to engage one of the pilot holes $b^3$ in the reaction bar $b^1$. An electrode $c^4$ is mounted on the other jaw $c^1$ of the gun which passes through a corresponding dowel hole $b^2$ in the pressure foot $b$. Thus the welding nose of gun C is located and maintained in pressure contact with the tank wall during the welding operation, electrode $b4$ being forced against the tank wall when the jaws $c$, $c'$ are expanded.

A spring $c^5$ is provided between the jaw $c^1$ and the flange of the pressure foot $b$ to prevent premature contact between the tank skin $a$ and the electrode $c^4$ during application of the gun.

A rubber or other resilient block $c^6$ is provided between the jaws $c$, $c'$ to provide a resilient spring pressure for the insertion of the projection $c^3$ into the pilot hole. The spring $c^5$ prevents the electrode $c^4$ from making premature contact with the skin $a$.

The tank skin $a$ is reinforced at each station by a rib D of Z or channel or other section extending peripherally around the inside of the skin. The rib D is formed with inner and outer peripheral flanges $d$. The ribs D are clamped in position at each station by an expanding internal unit extending between the opposite walls of the tank. The unit comprises a plurality of hydraulic jacks $D^1$, the cylinders of which are carried on a frame $d^1$ and the rams of which engage a backing bar $D^2$ formed in segments extending peripherally around the inner side of the tank in contact with the outer flange $d$ of the rib D which is in contact with the skin $a$.

All the jacks $D^1$ may be operated simultaneously, or in the case of an irregular-shaped tank it may be desirable to operate individually or to a programme, from a source of fluid supply through pipes $d^2$. An insulating strip $D^3$ is applied between the pressure foot $b$ and the skin $a$. The former B is connected to one electrical conductor $a^5$ and the rib D is connected to the second conductor $a^6$ and both conductors lead to a transformer.

When the unit is in position with the jacks $D^1$ exerting pressure outwardly on the skin $a$ against the former frame B, the gun C is applied in turn to the dowel holes $b^2$, $b^3$ with the projections $c^3$, $c^4$ therein and current is switched on to effect a spot weld between the skin $a$ and the rib D. The insulating strip $D^3$ between the former frame B and the skin $a$ is necessary as the gun C forms the electrical bridge between the reaction bar $b^1$ and the backing bar $D^2$. When air pressure in the cylinder of the portable gun expands the gun's caliper arms $c$, $c^1$, thus forcing the welding electrode $c^4$ through the dowel hole $b^2$ in the pressure foot $b$ into electrical contact with a skin $a$, the current is conducted by the flexible copper connection, and thus the gun forms an electrical bridge and completes the circuit thus forming the resistance weld between skin $a$ and rib D at the point desired. The current from the transformer may be conveyed to an outer lug on the reaction bar by a flexible or a solid copper connection. Similar connections from the backing bar $d^2$ complete the circuit back to the transformer. By mounting the gun C as above described the weld is effected at right angles to surface of the skin. The dowel holes ensure correct and accurate registration of the gun.

The frame $d'$ is mounted on rollers $d^4$ engaging a track formed by a girder $D^4$ extending longitudinally of the tank so that the unit may be moved from one station to the next. Registration holes are provided in the girder to locate the unit at each station.

The welding may be carried out under substantially constant pressure as no pressure is dissipated by the gun having to maintain the skin in contact with the rib since they are clamped together between the pressure foot and the internal unit.

The electrode pressure required to execute a sound resistance weld is very critical indeed, 10 lbs. high, or 10 lbs. low, being sufficient to cause an unsatisfactory weld in each instance. Therefore, if as with this system the joint to be welded is held rigidly between the pressure foot and the backing bar it necessarily follows that the welding gun can be arranged to give always the same constant pressure, and that the whole of this pressure is available to execute an accurate and consistently good weld.

Another important feature of resistance welding when the components are clamped as above described is that the peculiar tendency for a joint to be repelled outside the area of the weld by the reaction of the welding forces is prevented, and the resultant joint formed by the consecutive line of spot welds is exceedingly tight and of very good appearance, it being impossible to insert a feeler gauge even at points between the spot welds.

The expanding internal unit is employed to:

(1) Ensure that the flange of the baffle or former is held in intimate contact with the tank shell or skin.

(2) Provide a copper backing electrode on the inside of the baffle or former flange to conduct the welding current through a flexible conductor, and also to support the spot weld area rigidly when pressure is applied through the expanding welding gun.

When the ribs D have been secured at each station further reinforcing rods may be welded between the ribs.

After the welding of the ribs to the skin has been completed, the jacks on the internal unit are retracted, the unit is withdrawn and the ends of the tank may be seam welded thereto (FIGS. 9 and 10).

As shown in FIGS. 9 and 10 a flanged end closure member M is seam welded to the skin $a$. An internal former N of the shape of the tank A is inserted under the skin $a$. The former N may be constructed in two parts bolted together and capable of expansion by rods $n$ oppositely screwed at each end into lugs on the former parts and turnbuckle $n^1$. The seam welder O is mounted to travel in a stationary annular track P on rollers $o$ with the welding wheel $O^1$ externally engaging the skin $a$ which is prevented from deformation by the former N. The track P is carried on brackets $p$ secured to a frame or jig (not shown). The former N may be rotated within the closure member M to allow for the production of a continuous weld.

Although the invention has been described with reference to the spot welding of reinforcements to a tank it is also applicable for the manufacture of aircraft fuselages of all cross-sectional shapes, rockets, etc., while also it proves a great advantage for joining together long lengths of piping with an overlapping joint which may either be spot welded at pitched intervals or a seam welder may encircle the overlapping joint, the expanding internal frame together with the copper electrode being withdrawn successively from each open end of pipe.

Another application is the construction of large transit containers made from very thin stainless steel for ultra-lightness and corrosion-resistance, and should the external appearance demand a smooth exterior, then stiffeners, formers, flanges or baffles may be placed inside as hereinbefore described. Alternatively, such stiffeners with a double flange, if spot or seam welded externally, provide the dual purpose of providing stiffness, and also a means of providing an insulated air space if an outer skin is simultaneously or otherwise affixed to the external flange. It is also envisaged that other forms of insulating materials may be placed between such a double skin.

Alternatively, the method may be reversed by carrying out the seam welding operation from the interior of the tank before the spot welding operation.

I claim:

1. Apparatus for welding an internal metal member within a hollow metal component comprising means for clamping said member within said component with the regions of said member to be welded to said component extending in peripheral surface contact with the interior of said component around a weld zone, a rigid jig assembly adapted to be mounted to surround said component at said zone, said jig assembly having an annular surface adapted to extend in close conformity with and around the outer surface of said component with said outer surface urged under pressure against said annular jig surface by said clamping means, means on said jig assembly for positioning a welding gun in welding positions against the outer surface of said hollow component around said zone, means providing a track for extending longitudinally through said hollow component during the welding operation, and means mounting said clamping means for displacement along said track from one welding zone to another.

2. Apparatus for welding an internal metal member within a hollow sheet metal component comprising outwardly expansible means for clamping said member within said component with the regions of said member to be welded to said component extending in peripheral surface contact with the interior of said component around a weld zone, a rigid jig assembly adapted to be mounted to surround said component at said zone, said jig assembly comprising a pressure foot having an annular surface adapted to extend in close conformity with and around the outer surface of said component with said outer surface urged under pressure against said annular jig surface by said clamping means and means comprising a series of apertures through said pressure foot for positioning a welding gun in successive welding positions against said outer surface of said hollow component around said zone.

3. In the apparatus defined in claim 2, said jig assembly also comprising an outer reaction bar formed with a series of recesses corresponding and coacting with said apertures in the pressure foot for locating the welding gun.

References Cited by the Examiner

UNITED STATES PATENTS

| | | | |
|---|---|---|---|
| 1,096,506 | 5/14 | Haskin | 219—160 |
| 2,353,868 | 7/44 | Bisbee et al. | 219—160 X |
| 2,376,692 | 5/45 | Heim | 219—88 |
| 2,466,668 | 4/49 | Weightman | 219—87 |
| 3,076,086 | 1/63 | Adams | 219—78 |

RICHARD M. WOOD, *Primary Examiner.*